United States Patent [19]

Takehisa

[11] Patent Number: 5,559,861
[45] Date of Patent: Sep. 24, 1996

[54] BUTTON TELEPHONE SYSTEM WHICH DISPLAYS LINE STATUS INFORMATION

[75] Inventor: Yoshihiro Takehisa, Fukuoka, Japan

[73] Assignee: Matsushita Electric Industrial Co., Ltd., Osaka, Japan

[21] Appl. No.: 264,908

[22] Filed: Jun. 24, 1994

[30] Foreign Application Priority Data

Jul. 12, 1993 [JP] Japan .................. 5-171412

[51] Int. Cl.⁶ .............................. H04Q 7/20; H04Q 7/26
[52] U.S. Cl. ............................................. 379/58; 379/63
[58] Field of Search ............................... 379/58, 61, 63, 379/60; 455/54.1, 56.1

[56] References Cited

U.S. PATENT DOCUMENTS

| | | | |
|---|---|---|---|
| 4,768,218 | 8/1988 | Yorita | 379/61 |
| 4,833,702 | 5/1989 | Shitara et al. | 379/60 |
| 5,218,628 | 6/1993 | Ito | 379/58 |
| 5,365,572 | 11/1994 | Saegusa et al. | 379/61 |

Primary Examiner—Jason Chan
Assistant Examiner—William G. Trost
Attorney, Agent, or Firm—Watson Cole Stevens Davis, P.L.L.C.

[57] ABSTRACT

A button telephone system includes a parent telephone set and a child telephone set which are capable of radio communication. In a state in which data communication with a host private branch exchange is made, the parent telephone set is constructed so that it enters a mode in which a public telephone line condition signal sent from the host private branch exchange is converted into a signal adapted for the child telephone set and the converted signal is sent as a line vacant condition display signal to the child telephone set by radio waves. Even in the case where the parent telephone set is connected to an extension telephone line of the host private branch exchange, it is possible to transmit information of the public telephone line condition of the host private branch exchange intact to the child telephone set so that it is displayed in the child telephone set. Accordingly, a user can make signal transmission to a public telephone line after the public telephone line condition of the host private branch exchange is confirmed in the child telephone set.

11 Claims, 7 Drawing Sheets

F I G. 7A  HOST PBX → PARENT TELEPHONE SET

| data type | LED1 pattern | LED2 pattern | LED3 pattern | LED4 pattern | LED5 pattern | LED6 pattern | Check Seq. |
|---|---|---|---|---|---|---|---|
| a1 | | | | a2 | | | a3 |

F I G. 7B  PARENT TELEPHONE SET → CHILD TELEPHONE SET

| Freq CH No. | data length | PS-ID No. | data type | LED pattern | Check Seq. |
|---|---|---|---|---|---|
| b1 | b2 | b3 | b4 | b5 | |

F I G. 7C  CHILD TELEPHONE SET → PARENT TELEPHONE SET

| PS-ID No. | Press Inf. | Key Type | Check Seq. |
|---|---|---|---|
| c1 | c2 | c3 | |

F I G. 7D  PARENT TELEPHONE SET → HOST PBX

| Key Type | Mode Inf. | Check Seq. |
|---|---|---|
| d1 | d2 | |

BUTTON TELEPHONE SYSTEM WHICH DISPLAYS LINE STATUS INFORMATION

BACKGROUND OF THE INVENTION

1. Field of the Invention

The present invention relates to a radio button telephone system in which a parent telephone set and a child telephone set are connected by radio waves.

2. Description of the Related Art

A radio button telephone system is composed of a parent telephone set and a plurality of child telephone sets. The construction of the conventional radio button telephone system will now be explained in reference to FIGS. 1A and 1B.

Figures 1A, 1B:
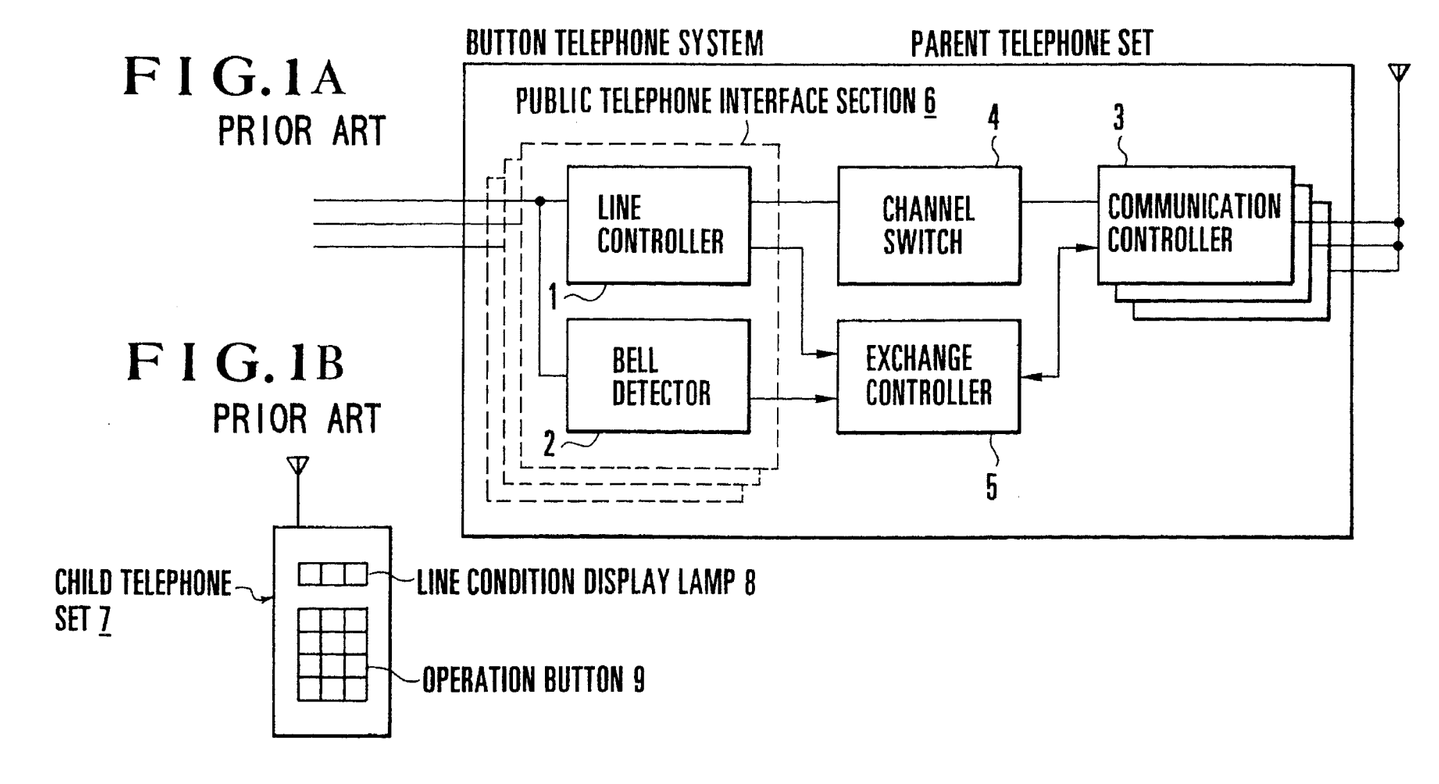
FIG. 1A is a block diagram showing the construction of a parent telephone set in the conventional button telephone system.
FIG. 1B is a diagram of a child telephone set in the conventional button telephone system.

FIG. 1A is a diagram showing the construction of a parent telephone set of the conventional radio button telephone system, and FIG. 1B is a diagram showing the construction of a child telephone set thereof. In FIG. 1A, reference numeral 1 denotes a line controller for outputting line seizure, disconnect, and select signals to a line connected to the parent telephone set and ensuring a voice signal channel. Numeral 2 denotes a bell detector for detecting a bell signal generated on the line at the time of call incoming. The line controller 1 and the bell detector 2 form a city telephone interface section 6.

Numeral 3 denotes a communication controller for making the communication of control data and a voice signal with a child telephone set or a private radio button telephone set. A plurality of communication controllers 3 may be prepared to cope with a plurality of child telephone sets. Numeral 4 denotes a channel switch for connecting and releasing a voice channel between any public telephone interface section 6 and any communication controller 3. Numeral 5 denotes an exchange controller for detecting a physical change in extension telephone and public telephone lines from the bell detector 2 and the communication controller 3 to control the line controller 1 and the channel switch 4 in accordance with a change in condition.

In FIG. 1B, reference numeral 7 denotes a child telephone set, numeral 8 a line condition display lamp for displaying the condition of a line connected to the public telephone interface section 6 such as a condition in which the line is in use, a condition in which the line is under call incoming and so forth, and numeral 9 an operation button such as a dial for operating the telephone set.

The operation of the conventional radio button telephone equipment having the above construction will now be explained. First, the explanation will be made of the operation in the case where signal transmission is made from the child telephone set 7. It is confirmed by the line condition display lamp 8 that a line connected to the public telephone interface section 6 is vacant. After the vacant line has been seized, the operation button 9 is depressed to make signal transmission. In this case, the line condition display lamp 8 shows that the child telephone set 7 itself is in use. Next, explanation will be made of the operation in the case where the child telephone set 7 answers to call incoming. When a signal representing call incoming is detected by the bell detector 2, the child telephone set 7 displays an "under call incoming" condition by the line condition display lamp 8 to operate a ringer. If the operation button 9 is depressed in this state, the child telephone set 7 answers to the call incoming so that conversation becomes possible and the line condition display lamp 8 is changed into a state of display of an "under conversation" condition.

In the above-mentioned conventional radio button telephone equipment, however, only the condition of the line connected to the parent telephone set is displayed by the line condition display lamp of the child telephone set. Therefore, in the case where the parent telephone set is connected as an extension telephone terminal to an extension telephone port of a private automatic branch exchange, the conventional radio button telephone equipment provides a problem that the equipment is different in operability and available service function from a button telephone set connected to the private automatic branch exchange. Namely, it is not possible to know the use condition of a public telephone line connected to the private automatic branch exchange even if signal transmission is desired for the public telephone line. Also, a public telephone line held by the private automatic branch exchange cannot be released from the hold. Further, the transfer to an extension telephone set of the private automatic branch exchange is not possible. Accordingly, in order to use the radio button telephone equipment as an extension telephone set of the private automatic branch exchange, there is no means other than the reconstruction of the private automatic branch exchange itself or the replacement of the private automatic branch exchange by one which is capable of coping with the requirement.

SUMMARY OF THE INVENTION

An object of the present invention made in light of the problem of the above-mentioned prior art is to improve the operability of a child telephone set of a button telephone system by making an automatic function change-over between the case where a parent telephone set of the button telephone system is connected to a private automatic branch exchange and the case where the parent telephone set is connected directly to a public telephone line.

To that end, a button telephone system according to the present invention is provided with private automatic branch exchange communication control means for automatically judging whether a line of a parent telephone set connected to a public telephone line is a host private automatic branch exchange or a public telephone line and making data communication in the case where the line is the host private automatic branch exchange, line condition display conversion means for converting line condition display information of the host private automatic branch exchange into data to a child telephone set, and button information conversion means for converting button depression information of the child telephone set into data to the host private automatic branch exchange.

With the above construction, in the case where the parent telephone set of the radio button telephone equipment of the present invention is connected to the public telephone line, the radio button telephone equipment of the present invention operates as a usual button telephone equipment to display a public telephone line condition of the parent telephone set by a line condition display lamp of the child ratio telephone set, thereby providing an operability similar to that of the conventional button telephone system.

On the other hand, in the case where the parent telephone set of the radio button telephone equipment of the present invention is connected to the host private automatic branch exchange, the radio button telephone equipment of the present invention operates as an attached device of a radio button telephone to display a public telephone line condition of the host private automatic branch exchange by the line condition display lamp of the child radio telephone set, thereby making it possible to operate the child radio telephone set included as if it was a child telephone set of the host private automatic branch exchange. Therefore, it becomes possible to provide the portability and convenience of the radio button telephone system without a change of the host private automatic branch exchange body or a change in operability of the child telephone set.

DESCRIPTION OF THE PREFERRED EMBODIMENTS

Figures 2A, 2B:
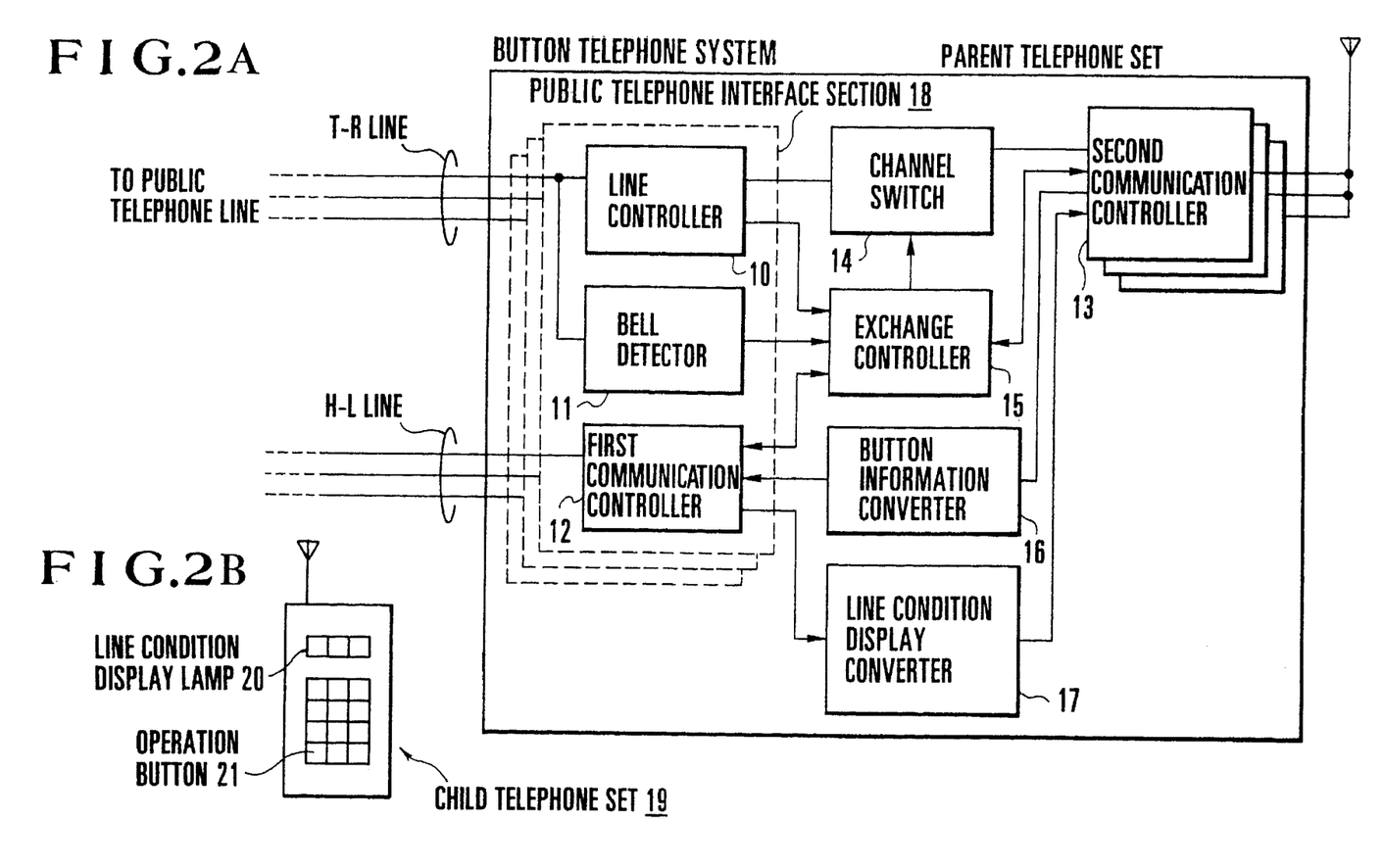
FIG. 2A is a block diagram showing the construction of a parent telephone set of a button telephone system in an embodiment of the present invention.
FIG. 2B is a diagram showing the construction of a child telephone set of the button telephone system in the embodiment of the present invention.

A button telephone system in an embodiment of the present invention will now be explained referring to the accompanying drawings. FIG. 2A is a block diagram showing the construction of a parent telephone set of the button telephone system in the embodiment of the present invention, and FIG. 2B is a diagram showing the construction of a private radio button telephone set (hereinafter referred to as child telephone set) of the button telephone system.

In FIG. 2A, one public telephone line of the parent telephone set is composed of a channel line (or T-R line) and a data communication line (or H-L line). The parent telephone set includes a plurality of such public telephone lines. Reference numeral 10 denotes a line controller for outputting line seizure, disconnect, and selection signals to a line (for example, a public telephone line or an extension telephone line of a host private automatic branch exchange) connected to the channel line (or T-R line) of the parent telephone set and ensuring a voice signal channel.

Figure 5:
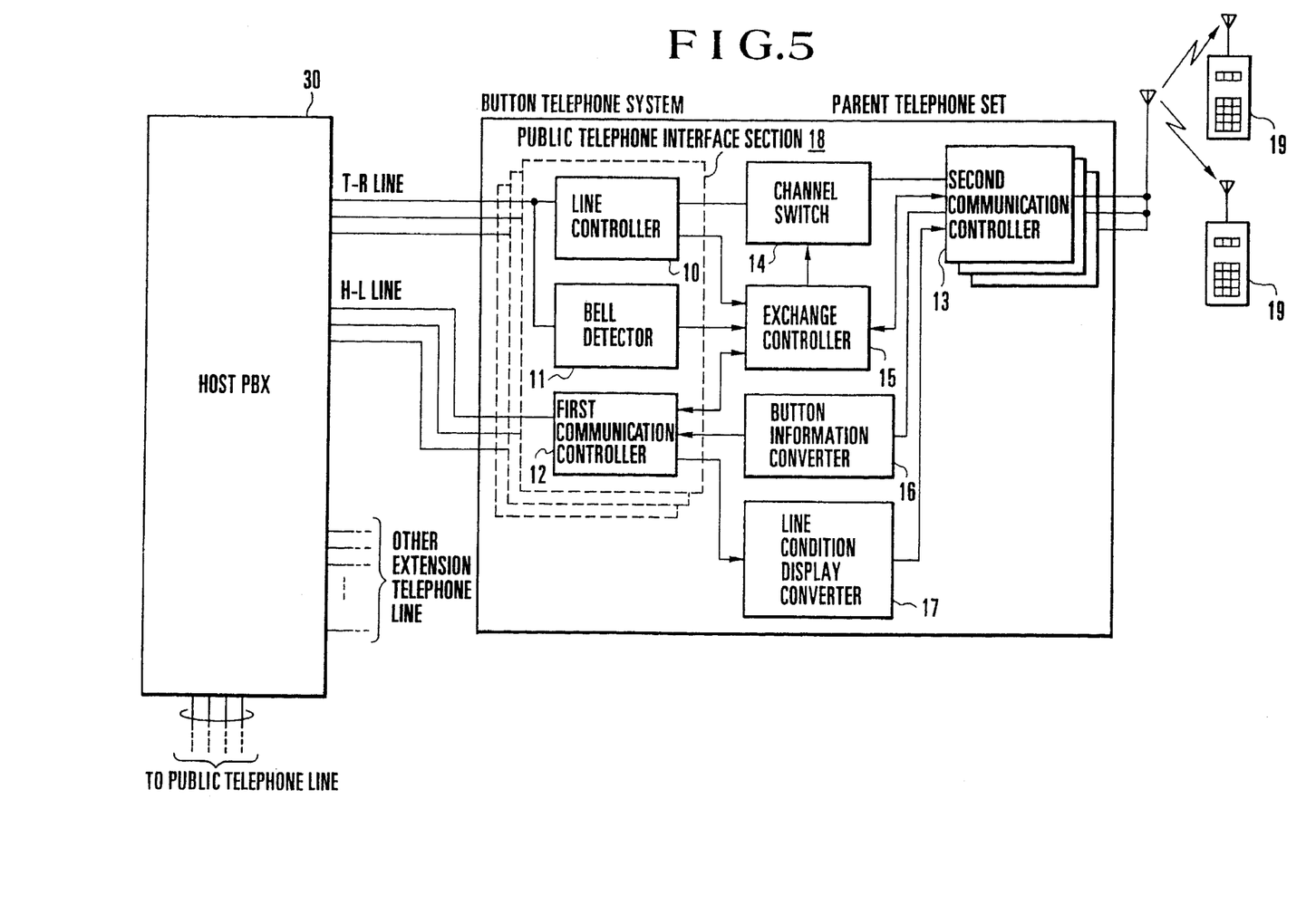
FIG. 5 is a block diagram showing a state in which the parent telephone set of the button telephone system in the embodiment of the present invention is connected to a private automatic branch exchange.

Numeral 11 denotes a bell detector for detecting a bell signal generated on the line at the time of call incoming. Numeral 12 denotes a first communication controller (a private automatic branch exchange communication controller) which operates, in the case where a host private automatic branch exchange 30 is connected to the public telephone line of the parent telephone set, as shown in FIG. 5, as a private button telephone of the host private automatic branch exchange 30 to make data communication with the host private automatic branch exchange 30 through the data communication line (or H-L line). The first communication controller 12 confirms whether or not the data communication is made through the data communication line (or H-L line), thereby automatically judging whether the host private automatic branch exchange is connected to the public telephone line of the parent telephone set or the public telephone line is connected to the public telephone line of the parent telephone set.

A set of the line controller 10, the bell detector 11 and the first communication controller 12 form a public telephone interface section 18. There are prepared a plurality of public telephone interface sections 18 the number of which is equal to the number of public telephone lines connected to the parent telephone set.

Numeral 13 denotes a second communication controller (a child telephone set communication controller) for making the communication of control data and a voice signal with a child telephone set. There are prepared a plurality of such second communication controllers 13, thereby making it possible to simultaneously use a plurality of child telephone sets. Numeral 14 denotes a channel switch for connecting and releasing a voice channel between any public telephone interface section 18 and any second communication controller 13.

Numeral 15 denotes an exchange controller for detecting a physical change in extension telephone and public telephone lines from the bell detector 11 and the second communication controller 13 to control the line controller 10, the first communication controller 12 and the channel switch 14 in accordance with a change of the condition.

The parent telephone set includes a button information converter 16 and a line condition display converter 17.

In FIG. 2B, reference numeral 19 denotes a child telephone set. Numeral 20 denotes a line condition display lamp for representing the condition of a line connected to the public telephone interface section 18 such as an "in use" condition of the line, an "under call incoming" condition of the line and so forth or the condition of a line connected to the public telephone line of the host private automatic branch exchange 30 such as an "in use" condition of the line, an "under call incoming" condition of the line and so forth. Numeral 21 denotes an operation button such as a dial for operating the child telephone set. The child telephone set 19 is provided with a child telephone set controller for lighting the line condition display lamp 20 in accordance with a line vacant condition display signal sent from the parent telephone set.

The operation of the button telephone system having the above construction will be explained by use of FIGS. 2A, 2B and 3.

Figure 3:
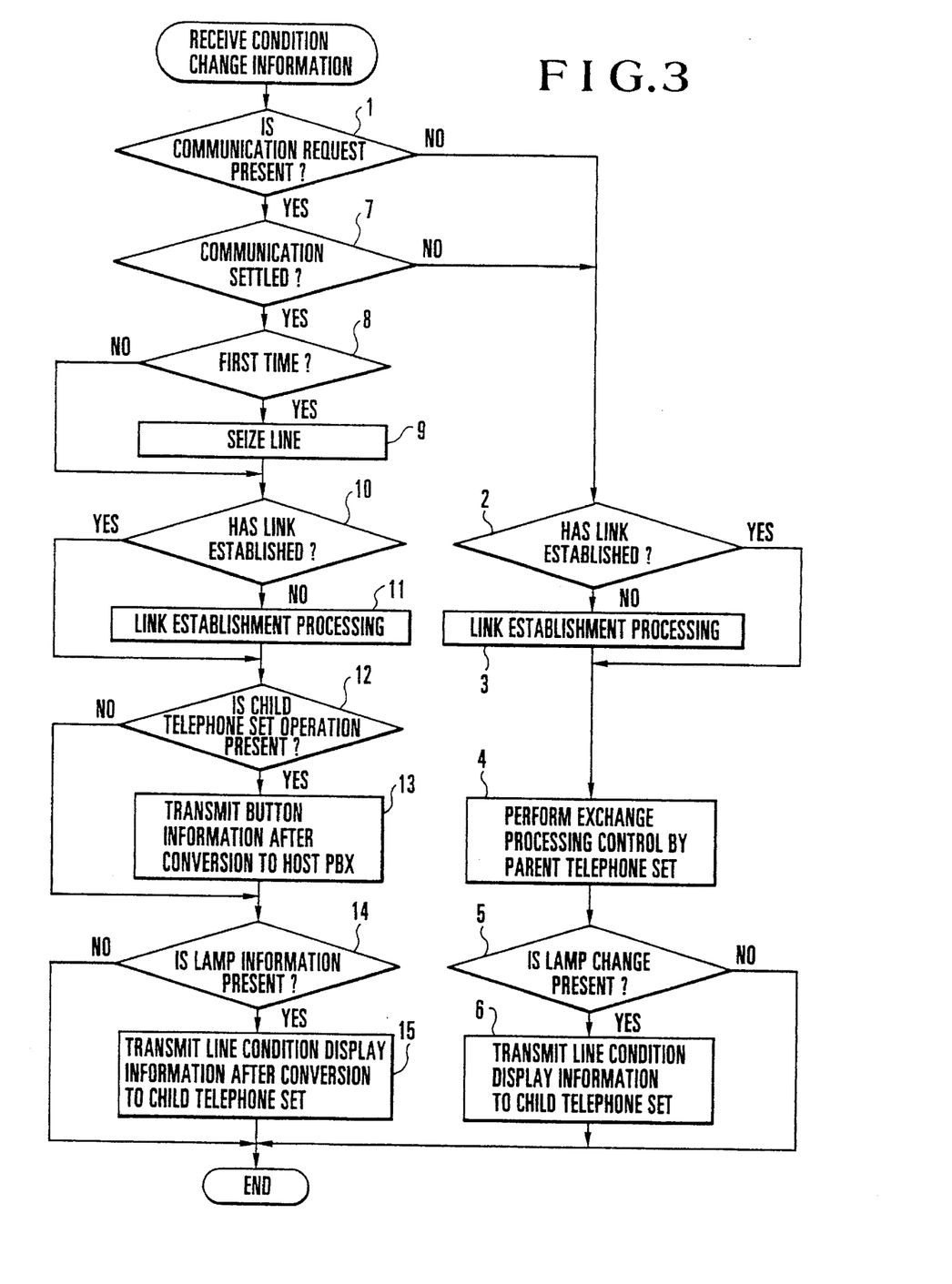
FIG. 3 is a flow chart showing the operation of the parent telephone set of the button telephone system in the embodiment of the present invention.

FIG. 3 is a flow chart showing the operation of the parent telephone set of the button telephone system in the embodiment of the present invention. The parent telephone set performs the operation shown by the flow chart in accordance with line change information detected by the public telephone interface section 18 and key operation information of the child telephone set 19 detected by the second communication controller 13.

In the case where the public telephone line of the parent telephone set is connected directly to the public telephone line (or in the case where no host private automatic branch exchange is interposed), data communication (outputted by the private branch exchange to each extension telephone line) is not generated in the first communication controller 12. In the case where no data communication is thus inputted to the first communication controller 12 (step 1), the parent telephone set operates as a parent telephone set of an independent button telephone system. When condition change information is received from the second communication controller 13 or the bell detector 11, the flow proceeds to step 4 directly if a radio communication link has already been established between the parent telephone set and the child telephone set 19 and to step 4 through step 3 if the radio communication link has not yet been established between the parent telephone set and the child telephone set 19. In step 3, a radio communication link establishment processing is performed. In step 4, the exchange controller 15 performs an exchange processing control for call origination from the child telephone set 19 received by the second communication controller 13, call termination from the public telephone line of the parent telephone set detected by the bell detector 11, and so forth, thereby controlling the intended channel switch 14 to enable public telephone conversation and extension telephone conversation.

In the case where any condition change is generated in the condition of the public telephone line of the parent telephone set as the result of the exchange processing control, a command is issued to the second communication controller 13 to display an "under conversation" condition, an "under call incoming" condition, an "under hold" condition, and so forth on the line condition display lamp 20 and line condition display information of the parent telephone set of the button telephone system is transmitted to the child telephone set 19 (steps 5 and 6).

Figure 4:
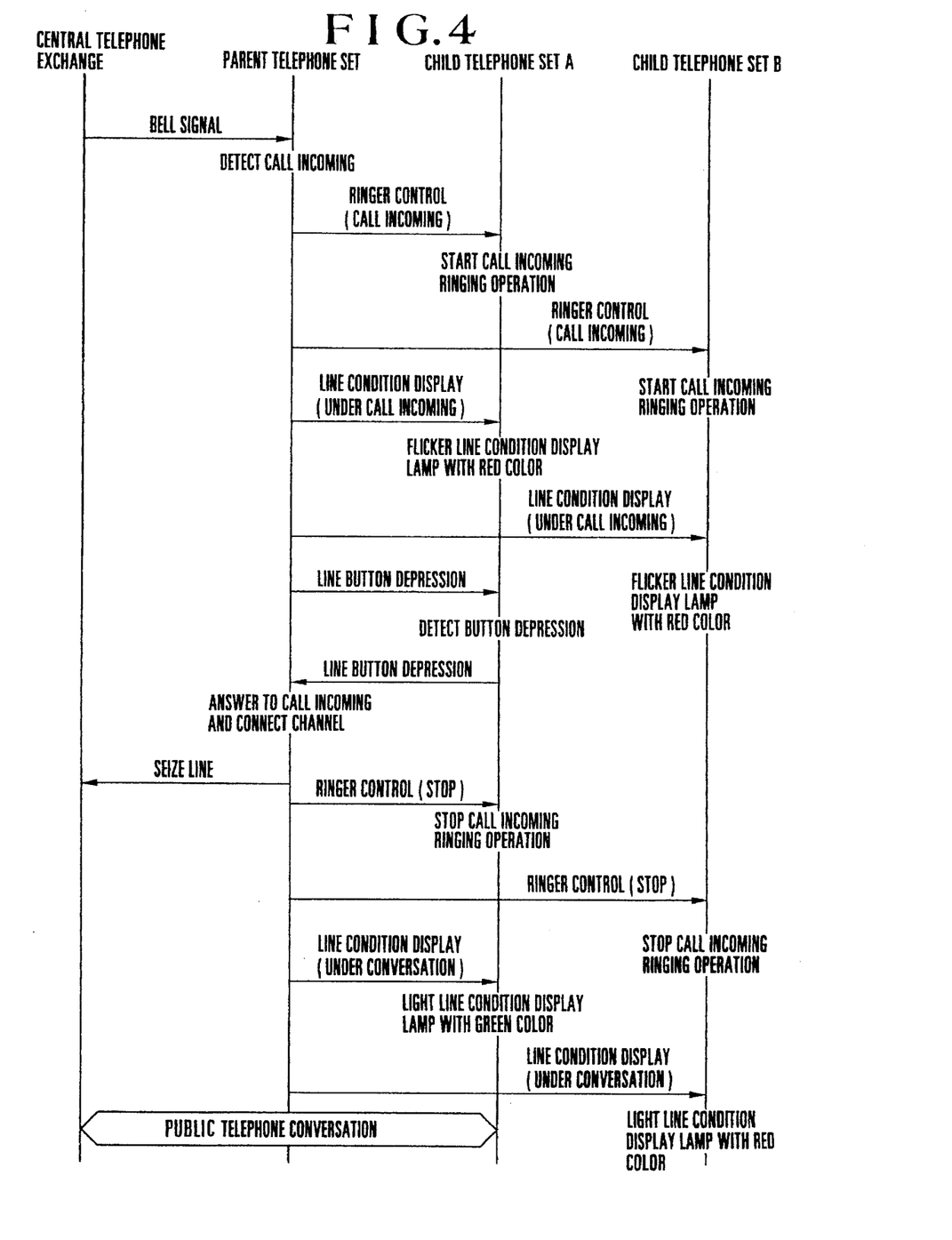
FIG. 4 is an operation sequence chart showing the transfer of control information between a central telephone exchange, the parent telephone set and child telephone sets in the button telephone system in the embodiment of the present invention.

For example, in the case where the parent telephone set receives a bell signal from the public telephone line and the child telephone set 19 answers, an operation as shown in FIG. 4 is performed.

FIG. 4 shows an operation sequence chart showing the transfer of information made between a central telephone exchange, the parent telephone set and the child telephone sets to perform their controls.

When a bell signal is generated on the public telephone line connected to the central telephone exchange, the parent telephone set detects the call incoming by the bell detector 11 and transmits ringer control data indicative of a call incoming ringing operation and line condition display data indicative of a flickered display of call incoming on the line condition display lamp 20 to the child telephone set 19 through the second communication controller 13. The child telephone set receiving those data starts the call incoming ringing operation and the flickering of the line condition display lamp. In the case where there are a plurality of child telephone sets, the data is transmitted to each child telephone set.

If a line button of "under call incoming" display is depressed at a child telephone set A, the exchange controller 15 of the parent telephone set judges an answer to the call incoming as being present. Then, the exchange controller 15 controls the line controller 10 to seize the line and connects the channel switch 14 to enable the public line telephone conversation of the child telephone set. Also, ringer control data indicating the stop of the call incoming ringing operation and line condition display data indicating the display of "in use" on the line condition display lamp are transmitted to the child telephone set which has performed the call incoming ringing operation.

Next, explanation will be made of the case where the public telephone line of the parent telephone set is connected to an extension telephone port of the host private automatic branch exchange 30 and the radio button telephone equipment is placed under the host private automatic branch exchange 30, as shown in FIG. 5. When the public telephone line of the parent telephone set is connected to the host private automatic branch exchange 30, data from the host private automatic branch exchange 30 comes to the first communication controller 12 in the parent telephone set. If the data comes to the first communication controller 12 (step 1 in FIG. 3) and a predetermined number of times of incoming of the data continues, the communication is judged as being successful (or communication settled) so that the parent telephone set recognizes the connection of the host private automatic branch exchange 30 to the public telephone line (step 7). In accordance with this data communication, the parent telephone set enters a mode in which it operates as an extension telephone terminal of the host private automatic exchange.

When the connection to the host private automatic branch exchange 30 is thus recognized, the line controller 10 is controlled to seize the line (steps 8 and 9). After this, the button telephone system operates as a behind type button telephone system connected to the host private automatic branch exchange 30.

If condition change information is received from the first communication controller 12 or the second communication controller 13 and a radio communication link is not established between the parent telephone set and the child telephone set 19, the exchange controller 15 performs a radio communication link establishment processing (steps 10 and 11).

When the radio communication link is established, the channel switch 14 is controlled to ensure a voice channel. With this state, the reception of condition change information from the child telephone set becomes possible and the transmission of condition change information from the parent telephone set to the child telephone set becomes possible.

Namely, in the case where the condition change information activating the parent telephone set is depression information of the operation button 21 of the child telephone set 19, this information is converted by the button information converter 16 into button information comprehensible by the host private automatic branch exchange 30 and is then outputted to the first communication controller 12. This information is then sent to the host private automatic branch exchange 30 through the first communication controller 12 (steps 12 and 13).

On the other hand, in the case where the condition change information activating the parent telephone set is line condition display information of the host private automatic branch exchange 30, the following operation is performed. A public telephone line condition signal indicating vacant information of the public telephone line of the host private automatic branch exchange 30 is always sent from the host private automatic branch exchange 30 to the first communication controller 12. The line condition display converter 17 converts the public telephone line condition signal acquired by the first communication controller 12 into lighting information for lighting the line condition display lamp 20 in the child telephone set 19 and outputs the lighting information to the second communication controller 13. This information is then sent to the child telephone set 19 through the second communication controller 13 (steps 14 and 15). In the child telephone set 19, the line condition display lamp 20 is lit in accordance with the sent lamp lighting information to display the line condition.

Figure 6:
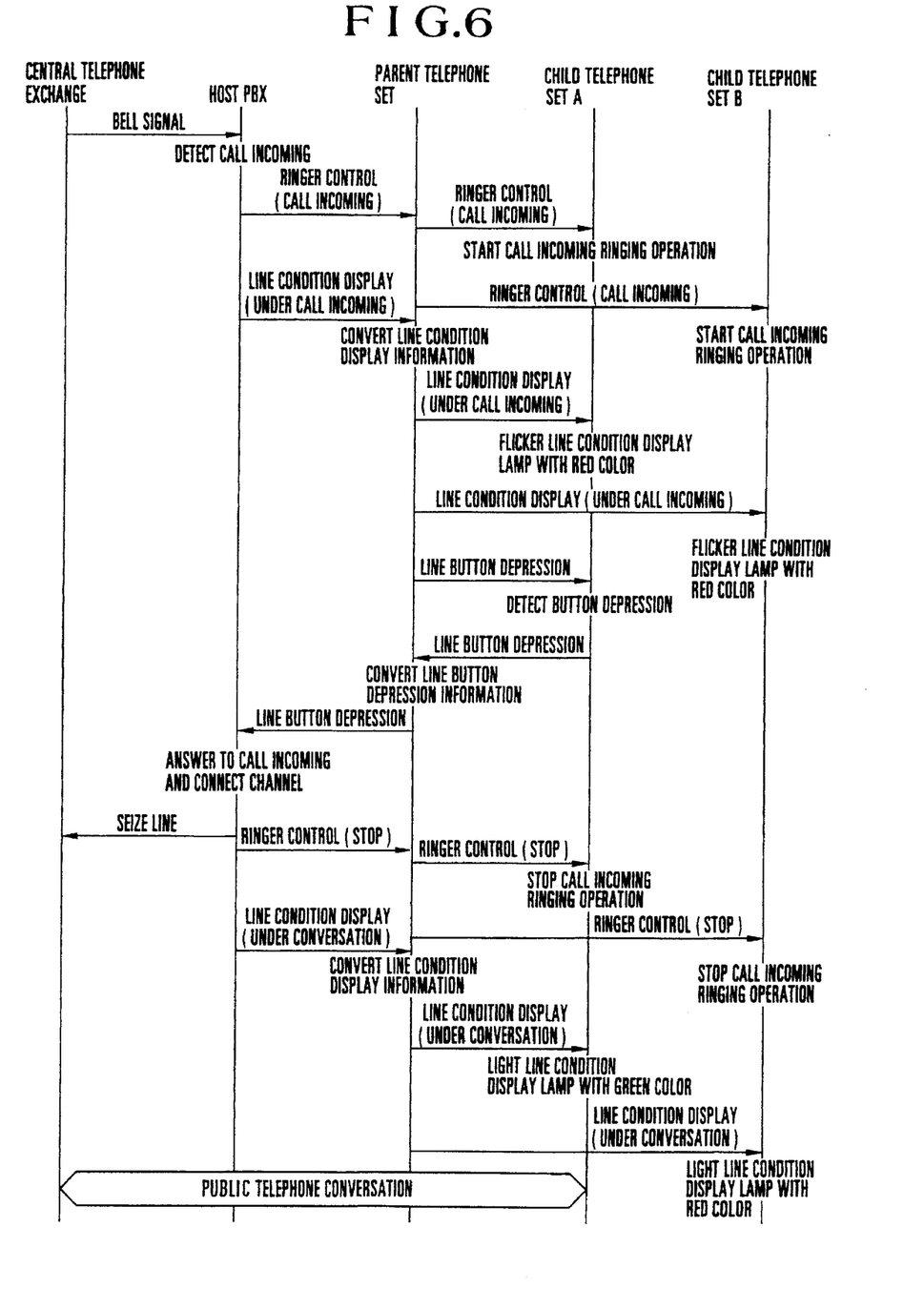
FIG. 6 is an operation sequence chart showing the transfer of control information between the central telephone exchange, the host private automatic branch exchange, the parent telephone set and the child telephone sets in the button telephone system in the embodiment of the present invention.

For example, in the case where the host private automatic branch exchange 30 receives a bell signal from the public telephone line and the child telephone set 19 answers, an operation as shown in FIG. 6 is performed.

FIG. 6 shows an operation sequence chart showing the transfer of information made between the central telephone exchange, the host private automatic branch exchange, the parent telephone set and the child telephone sets to perform their controls.

When a bell signal is generated on the public telephone line connected to the central telephone exchange, the host private automatic branch exchange 30 informs a designated extension telephone terminal of ringer control information representative of call incoming at the public telephone line and line condition display information representative of a change of the kind of lighting of the line condition display lamp by use of an H-L line which communicates with the extension telephone terminal. Since the public telephone line of the parent telephone set is connected to the extension telephone port of the host private automatic branch exchange 30, the parent telephone set receives extension telephone terminal control information from the host private automatic branch exchange 30 by the first communication controller 12 and interprets the contents of control. Thereafter, the parent telephone set informs the child telephone set 19 through the second communication controller 13 of the control information. In this case, since the line condition display information received by the parent telephone set from the host private automatic branch exchange 30 is line condition display lamp control information for the extension telephone terminal, the parent telephone set converts this information by the line condition display converter 17 into line condition display lamp control information for the child telephone set to perform the transmission of data.

Figure 7A:
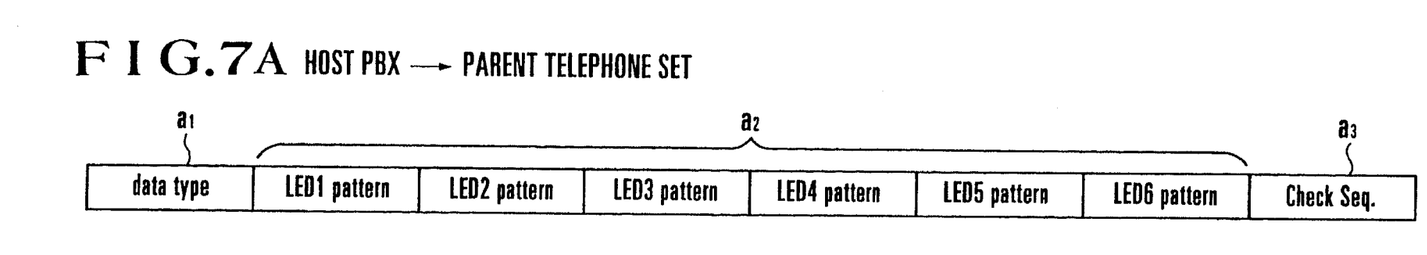
FIG. 7A is a diagram showing a frame of display information sent from the host private automatic branch exchange to each extension telephone terminal.

FIG. 7A shows a frame of display information sent from the host private automatic branch exchange 30 to each extension telephone terminal. Display information of LED or LCD is sent at every several hundreds milliseconds with the frame shown in FIG. 7A from the host private automatic branch exchange 30 to each extension telephone terminal. In a state in which the parent telephone set of the radio button telephone equipment is connected to the extension telephone line of the host private automatic branch exchange 30, the display information having the frame shown in FIG. 7A is sent from the host private automatic branch exchange 30 to the parent telephone set of the radio button telephone equipment. This information is the contents of data before conversion. Reference symbol a1 denotes information indicating whether or not the information is information for LED control, symbol a2 information indicating the turn-on, flickering or turn-off of each LED, and symbol a3 information for parity check.

Figure 7B:
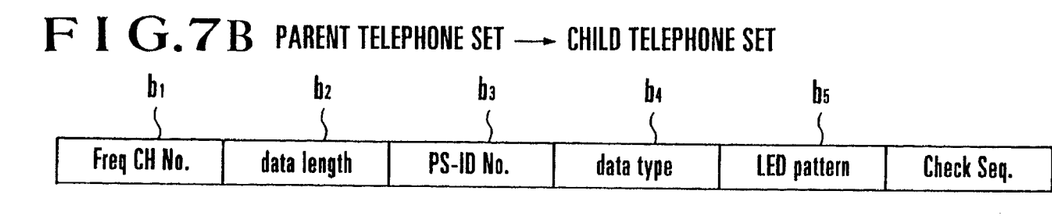
FIG. 7B is a diagram showing a frame in the case where the parent telephone set sends display information to the child telephone set.

FIG. 7B shows a frame in the case where the parent telephone set sends display information to the child telephone set. At every predetermined time or when there is an event change such as generation of call incoming, data having a frame as shown in FIG. 7B is sent from the parent telephone set to the child telephone set. Reference symbol b1 denotes a channel number, symbol b2 a length of data, symbol b3 an ID number of a child telephone set or an ID number of a group, symbol b4 data indicating LED, and symbol b5 information indicating the turn-on, flickering or turn-off of the LED indicated by symbol b4.

In the parent telephone set, the line condition display converter 17 converts the display information from the host private automatic branch exchange 30 into data which is capable of being transmitted to the child telephone set. Namely, the display information is extracted from the frame shown in FIG. 7A to organize a frame in the case where it is transmitted to the child telephone set. The data after conversion is transmitted with the frame of FIG. 7B to the child telephone set.

The child telephone set receiving the data starts a call incoming ringing operation and a flickering of the line condition display lamp. In the case where there are a plurality of child telephone sets, the data is transmitted to each child telephone set. Accordingly, the child telephone set of the radio button telephone equipment can operate in a manner quite similar to an extension telephone terminal connected directly to the host private automatic branch exchange 30 so that the line condition of the public telephone line of the host private automatic branch exchange 30 is displayed on the line condition display lamp and the ringing of a public telephone call incoming tone is made.

Figure 7C:
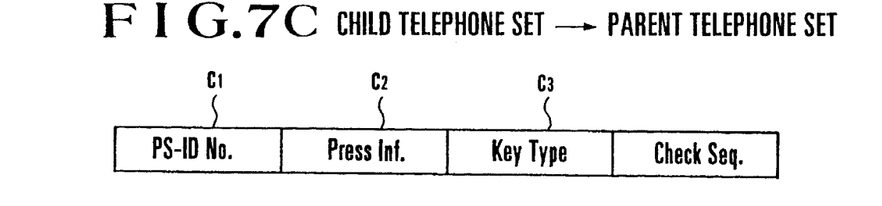
FIG. 7C is a diagram showing a frame in the case where button operation information is sent from the child telephone set of the button telephone system to the parent telephone set thereof.

If a line button of "under call incoming display" is depressed at a child telephone set A, button operation information is transmitted to the parent telephone set. FIG. 7C shows a frame in the case where the button operation information is transmitted from the child telephone set of the radio button telephone equipment to the parent telephone set. Reference symbol c1 denotes an ID number of a child telephone set, symbol c2 information indicating whether or not the depression of a key is continued, and symbol c3 information indicating the type of a key which is depressed.

Figure 7D:
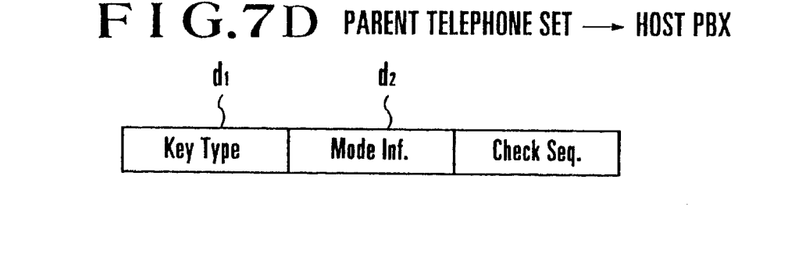
FIG. 7D is a diagram showing a frame including button operation information which is sent to the host private automatic exchange by the parent telephone set of the button telephone system as an extension telephone terminal.

The button operation information from the child telephone set is received by the second communication controller 13 of the parent telephone set. In the parent telephone set, the button information converter 16 converts the received button operation information into data which the parent telephone set can transmit as an extension telephone terminal to the host private automatic branch exchange 30. Namely, the button operation information is extracted from the frame shown in FIG. 7C to organize a frame in the case where it is transmitted to the host private automatic branch exchange 30. FIG. 7D shows the contents of data after conversion, that is, a frame including the button operation information which the parent telephone set of the button telephone system transmits as the extension telephone terminal to the host private automatic branch exchange 30. Reference symbols d1 and d2 denote information indicating the type of a depressed key.

The converted data is transmitted to the host private automatic branch exchange 30 through the first communication controller 12.

The host private automatic branch exchange 30 receiving this data judges an answer to the call incoming as being present, seizes the line of the central telephone exchange and forms a channel between the public telephone line and the extension telephone line so that the public line telephone conversation by the child telephone set becomes possible. Also, the host private automatic branch exchange 30 transmits ringer control data indicative of the stop of the call incoming ringing operation and line condition display data indicative of the display of "in use" on the line condition display lamp to the extension telephone terminal which has provided the call incoming. The parent telephone set receives extension telephone terminal control information from the host private automatic branch exchange 30 by the first communication controller 12 and interprets the contents of control. Thereafter, the parent telephone set transmits the ringer control data indicative of the stop of the call incoming ringing operation and the line condition display data indicative of the display of "in use" on the line condition display lamp through the second communication controller 13 to the child telephone set which has performed the call incoming ringing operation. With reception of those data, the line condition display lamp of the child telephone set having answered is continuously lit with a green color showing that the child telephone set itself is under use while the line condition display lamp of each of the other child telephone sets is continuously lit with a red color showing that a child telephone set other than that child telephone set is under use. Accordingly, the child telephone set of the button telephone system can answer to the call incoming on a public telephone line in a manner quite similar to an extension telephone terminal connected directly to the host private automatic branch exchange 30 and can confirm the use condition of the line by the line condition display lamp.

Although the invention has been described in its preferred form with a certain degree of particularity, it is understood that the present disclosure of the preferred form has been changed in the details of construction and the combination and arrangement of parts may be resorted to without departing from the spirit and the scope of the invention as hereinafter claimed.

I claim:

1. A button telephone system comprising a parent telephone set provided with an exchange function, and a child telephone set, said parent telephone set being connected to a public telephone line through a channel line and being connected to a host private branch exchange through said channel line and a data communication line, said parent telephone set including:

a public telephone interface section having a line control means for transmitting a second voice signal, which is transmitted from said child telephone set, to said public telephone line or an extension telephone line of said host private branch exchange through said channel line, and a first communication control means for performing data communication with said host private branch exchange through said data communication line;

second communication control means for performing radio communication with said child telephone set by modulating a first voice signal, which is transmitted from said public telephone line or said extension telephone line of said host private branch exchange through said channel line, by modulating a first control data into a first radio wave to transmit said first radio wave to said child telephone set, and by receiving a second radio wave, which is transmitted from said child telephone set, to demodulate a second control data and said second voice signal from said second radio wave;

a channel switch provided between said line control means and said second communication control means, for connecting and releasing a voice channel between said public telephone interface section and said second communication control means; and line condition display conversion means for converting an external telephone line condition signal into a line condition display signal which is transmitted to said child telephone set, said external telephone line condition signal being transmitted from said host private branch exchange through said data communication line and said first communication control means;

wherein when communication request data are transmitted from said host private branch exchange to said first communication control means through said data communication line, said parent telephone set enters a mode in which said parent telephone set operates as an extension telephone terminal of said host private branch exchange, and said second communication control means modulates said line condition display signal into said first radio wave to transmit the modulated first radio wave to said child telephone set, and said child telephone set including:

line condition display means;

child telephone set control means for controlling said line condition display means to display a line condition in accordance with said line condition display signal transmitted from said parent telephone set; and an operation button used for operating said child telephone set.

2. A button telephone system according to claim 1, wherein:

said public telephone interface section transmits a line seizure signal informing a line seizure and a line disconnect signal informing a line disconnection to said extension line of said host private branch exchange;

said first control data include ringer control data indicative of a call incoming ringing operation or a stop of said call incoming ringing operation; and said second control data include button depression information of said operation button operated in said child telephone set.

3. A button telephone system according to claim 1, wherein:

said line condition display signal includes information indicating whether or not a public telephone line of said host private branch exchange is vacant; and when said line condition display signal indicating that said public telephone line of said host private branch exchange is vacant is transmitted from said parent telephone set, said child telephone set control means of said child telephone set controls said line condition display means to display a line vacant condition as said line condition.

4. A button telephone system according to claim 1, wherein said line condition display means of said child telephone set includes a lamp for line condition display.

5. A button telephone system according to claim 1, wherein when said public telephone interface section performs no data communication with said host private branch exchange through said data communication line, said parent telephone set transmits a signal indicating the line condition of said parent telephone set to said child telephone set as said line condition display signal.

6. A button telephone system according to claim 5, wherein said line condition display means of said child telephone set includes a lamp for line condition display.

7. A button telephone system according to claim 1, wherein:

said public telephone interface section of said parent telephone set further includes bell detection means for detecting a bell signal occurring on said channel line to detect a call incoming; and said parent telephone set further includes exchange control means for controlling said channel switch to connect a voice signal channel line between said public telephone interface section and said second communication control means in accordance with the detection of the call incoming in said bell detection means and a call origination from said child telephone set received by said second communication control means.

8. A button telephone system according to claim 7, wherein:

said public telephone interface section transmits a line seizure signal informing a line seizure and a line disconnect signal informing a line disconnection to said extension line of said host private branch exchange;

said first control data include ringer control data indicative of a call incoming ringing operation or a stop of said call incoming ringing operation; and said second control data include button depression information of said operation button operated in said child telephone set.

9. A button telephone system according to claim 7, wherein said line condition display means of said child telephone set includes a lamp for line condition display.

10. A button telephone system according to claim 8, wherein said parent telephone set further includes button information conversion means for converting said button depression information from said child telephone set, which is received by said second communication control means, into button information comprehensible by said host private branch exchange, and then transmits said button information to said first communication control means.

11. A button telephone system according to claim 10, wherein said line condition display means of said child telephone set includes a lamp for line condition display.

* * * * *